(12) United States Patent
Asada

(10) Patent No.: US 11,211,957 B2
(45) Date of Patent: Dec. 28, 2021

(54) WIRELESS TRANSMITTER

(71) Applicant: NEC Platforms, Ltd., Kawasaki (JP)

(72) Inventor: Hideyuki Asada, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 16/978,304

(22) PCT Filed: Feb. 18, 2019

(86) PCT No.: PCT/JP2019/005742
§ 371 (c)(1),
(2) Date: Sep. 4, 2020

(87) PCT Pub. No.: WO2019/171919
PCT Pub. Date: Sep. 12, 2019

(65) Prior Publication Data
US 2020/0412389 A1      Dec. 31, 2020

(30) Foreign Application Priority Data

Mar. 8, 2018 (JP) .............................. JP2018-041553

(51) Int. Cl.
*H04B 1/04* (2006.01)
*H04W 4/70* (2018.01)
*G16Y 10/35* (2020.01)
*G16Y 20/30* (2020.01)

(52) U.S. Cl.
CPC ................ *H04B 1/04* (2013.01); *G16Y 10/35* (2020.01); *G16Y 20/30* (2020.01); *H04W 4/70* (2018.02)

(58) Field of Classification Search
CPC .. G16Y 20/00–40; G16Y 10/35; G16Y 20/30; H04W 4/70; H04B 1/04
See application file for complete search history.

(56) References Cited

U.S. PATENT DOCUMENTS

| 6,185,418 | B1 | 2/2001 | MacLellan et al. |
| 2010/0318712 | A1* | 12/2010 | Boldyrev ............ G06F 9/44573 |
| | | | 710/308 |
| 2011/0143688 | A1* | 6/2011 | O'keeffe ................ H04B 17/10 |
| | | | 455/73 |
| 2013/0176051 | A1 | 7/2013 | Nakaya |

(Continued)

FOREIGN PATENT DOCUMENTS

| JP | H11-220413 A | 8/1999 |
| JP | 2006-333328 A | 12/2006 |

(Continued)

OTHER PUBLICATIONS

International Search Report for PCT Application No. PCT/JP2019/005742, dated May 7, 2019.

(Continued)

*Primary Examiner* — Raymond S Dean
(74) *Attorney, Agent, or Firm* — Sughrue Mion, PLLC

(57) ABSTRACT

An Internet-of-things (IoT)/machine-to-machine (MTM) wireless transmitter is obtained that has a semiconductor device including variable-resistance elements each of which is nonvolatile and rewritable and is able to hold each internal state without electric energy, and a modulator for receiving information from the semiconductor device and transmitting the information as a wireless signal.

9 Claims, 5 Drawing Sheets

(56) References Cited

U.S. PATENT DOCUMENTS

| | | | |
|---|---|---|---|
| 2014/0331073 A1 | 11/2014 | Feng et al. | |
| 2015/0131358 A1 | 5/2015 | Miyamura et al. | |
| 2015/0319630 A1* | 11/2015 | Kerberg | H04B 7/082 370/252 |
| 2016/0128043 A1* | 5/2016 | Shuman | H04W 4/029 370/331 |
| 2017/0110784 A1* | 4/2017 | Vermes | H01Q 1/2291 |
| 2019/0190592 A1* | 6/2019 | Mayer | H04B 7/18513 |

FOREIGN PATENT DOCUMENTS

| | | |
|---|---|---|
| JP | 2015-508523 A | 3/2015 |
| WO | 2012/032937 A1 | 3/2012 |
| WO | 2013/190741 A1 | 12/2013 |

OTHER PUBLICATIONS

English translation of Written opinion for PCT Application No. PCT/JP2019/005742, dated May 7, 2019.
Toshiki Higashi et al., Area-efficient LUT-like Programmable Logic Using Atom Switch and its Delay-optimal Mapping Algorithm, IEICE Technical Report, Nov. 2016, vol. 116, pp. 29-34, Japan.
Takuji Imai, Hot News, Nikkei Electronics No. 1186, p. 17, Dec. 2017, Japan.

* cited by examiner

WIRELESS TRANSMITTER

This application is a National Stage Entry of PCT/JP2019/005742 filed on Feb. 18, 2019, which claims priority from Japanese Patent Application 2018-041553 filed on Mar. 8, 2018, the contents of all of which are incorporated herein by reference, in their entirety.

TECHNICAL FIELD

This invention relates to a wireless transmitter and, in particular, to a wireless transmitter suitable for IoT (Internet of Things) and/or MTM (Machine to Machine).

BACKGROUND ART

Recently, attention has been focused on IoT and/or MTM. IoT and/or MTM requires a wireless transmitter for wireless transmission from a device including a sensor to another device/gateway. The device used in IoT and/or MTM is often installed at a location without a power source or at a position remote from the power source. In order to supply power to such device, it is preferable to utilize natural energy obtained by wind power generation, solar power generation, or the like.

Patent Document 1 discloses a system used in IoT and/or MTM. However, Patent Document 1 does not disclose any problem in case where the natural energy is supplied to the device such as the wireless transmitter used in IoT and/or MTM.

On the other hand, in case where the natural energy is supplied to the device such as the wireless transmitter used in IoT and/or MTM, supply of the natural energy is unstable. Therefore, if the natural energy is directly supplied to the device including the sensor, a behavior of the wireless transmitter included in the device inevitably becomes unstable so that continuously stable operation of IoT or MTM is difficult.

In order to reduce an influence of unstableness of the natural energy, it is conceivable to supply the natural energy to the wireless transmitter through a capacitor element, such as an electrolytic capacitor, a supercapacitor, an electric double-layer capacitor. In this case, the capacitor element temporarily store a small capacity of electric energy and repeatedly carries out charge and discharge in response to variation in natural energy.

Thus, even if the power from the capacitor element is supplied to the wireless transmitter, the behavior of the wireless transmitter cannot be fully stabilized due to the charge and the discharge of the capacitor element.

PRIOR ART LITERATURE(S)

Patent Literature(s)

[Patent Literature 1] JP 2015-508523 A
[Patent Literature 2] WO 2013/190741 A1
[Patent Literature 3] WO 2012/032937 A1

SUMMARY OF THE INVENTION

Problem to be Solved by the Invention

The wireless transmitter used in IoT and/or MTM (hereinafter abbreviated to IoT/MTM wireless transmitter) is also required to be low in power consumption. In order to mitigate the influence due to the charge and the discharge of the capacitor element and to perform computation on numerical information from the sensor, it is conceivable to apply a semiconductor device having a logical component to the IoT/MTM wireless transmitter.

Actually, however, it is a real situation that no case example is found in which the semiconductor device including the logical component is applied to the IoT/MTM wireless transmitter operated by the natural energy. For example, it has been revealed that, even if the semiconductor device, such as a CPLD (Complex Programmable Logic Device) and a FPGA (Field Programmable Gate Array), including the logical component is applied to the IoT/MTM wireless transmitter, there are insufficiencies in view of low power consumption and an operation speed when power supply is turned on.

It is an object of this invention to provide a wireless transmitter and a wireless transmission method which are capable of achieving low power consumption suitable for IoT/MTM.

It is another object of this invention to provide a wireless transmitter and a wireless transmission method which are capable of achieving low power consumption as compared with a semiconductor device such as a CPLD and an FPGA.

Means to Solve the Problem

According to one embodiment of this invention, there is provided an IoT/MTM wireless transmitter comprising a semiconductor device including variable-resistance elements each of which is non-volatile and rewritable and is configured to hold each internal state without electric energy, and a modulator configured to receive information from the semiconductor device and transmit the information as a wireless signal.

According to another embodiment of this invention, there is provided an IoT/MTM wireless transmission method of processing information from the sensor to produce and transmit a wireless signal by using a NanoBridge (Registered Trademark)-FPGA (hereinafter abbreviated to NB-FPGA) as a semiconductor device including variable-resistance elements each of which is non-volatile and rewritable and is configured to hold each internal state without electric energy.

It is noted here that, as the NB-FPGA, semiconductor devices described in Patent Literatures 2 and 3 may be used. The NB-FPGA has, at portions where each connection/non-connection between transistors is determined, variable-resistance elements each of which is nonvolatile and rewritable and is capable of holding an internal state without electric energy. The variable-resistance elements of the NB-FPGA are constituted by variable-resistance elements such as a ReRAM (Resistance Random Access Memory) using a transition metal oxide and a non-volatile Nano-Bridge (Registered Trademark) using an ion conductor. Each cell is capable of holding circuit information in a non-volatile manner.

Effect of the Invention

According to this invention, it is possible to obtain an IoT/MTM wireless transmitter and an IoT/MTM wireless transmission method which are capable of performing a stable operation with low power and which are high in wake-up speed when power supply is turned on.

MODE FOR EMBODYING THE INVENTION

Principle of Embodiment of this Invention

Figure 1:
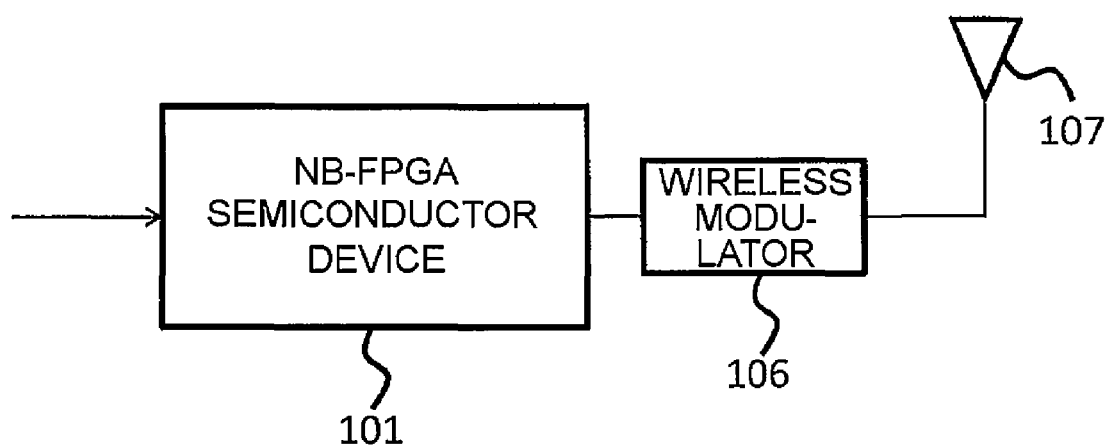
FIG. 1 is a block diagram for principally describing an IoT/MTM wireless transmitter according to one embodiment of this invention.

Referring to FIG. 1, a principal structure of an IoT/MTM wireless transmitter according to an embodiment of this invention is illustrated. The IoT/MTM wireless transmitter illustrated in the figure is capable of performing a stable operation even with a small capacity of electric power and is also capable of performing a stable operation even when natural energy drastically variable is used as a power source.

Accordingly, the IoT/MTM wireless transmitter can use, as a power source, a capacitor element, such as an electrolytic capacitor, a supercapacitor, and an electric double-layer capacitor, which is capable of temporarily storing a small capacity of electric energy.

Referring to FIG. 1, the principal structure of the IoT/MTM wireless transmitter according to the embodiment of this invention is illustrated. In order to enable a stable operation with low power consumption, as illustrated in FIG. 1, the IoT/MTM wireless transmitter according to the embodiment of this invention comprises a NB-FPGA semiconductor device 101 including variable-resistance elements of non-volatile NanoBridge (Registered Trademark) and a modulator 106 which receives information from the semiconductor device and transmits the information as a wireless signal.

The signal from the modulator 106 is transmitted through an antenna 107 to a server or the like.

Herein, each of the variable-resistance elements included in the NB-FPGA semiconductor device 101 is non-volatile and rewritable. Furthermore, the NB-FPGA semiconductor device 101 has a characteristic that respective states before power loss can be saved even when no power is supplied. The respective states include an internal state of the NB-FPGA semiconductor device 101 and a state of circuit connections.

On the other hand, a commercially available semiconductor device such as a CPLD (Complex Programmable Logic Device) or a FPGA (Field Programmable Gate Array) is applied to the IoT/MTM wireless transmitter, sufficiently low power consumption cannot be achieved. The semiconductor device, such as the CPLD and the FPGA, includes constituent circuits such as transistors included inside a semiconductor, other circuits between elements, and a RAM (Random Access Memory). In the CPLD or the FPGA, it is possible to repeatedly rewrite states of those constituent circuits. However, the states of the constituent elements must be held by supplying electric energy.

In view of the above, in addition to the electric energy for operating the constituent elements inside the commercially available semiconductor device mentioned above, stationary electric energy is required so as to hold the states of circuit connections between transistors formed inside the semiconductor device and other elements.

Now, description will be made of a case where the commercially available semiconductor device such as the CPLD or the FPGA is applied to an IoT/MTM device. In the IoT/MTM device, it is necessary to transmit numerical information of a sensor or the like used in IoT or M2M to a gateway apparatus remote from the device. However, the semiconductor device such as the CPLD or the FPGA has large power consumption. Accordingly, it is not possible to use, as a power source, a capacitor element, such as an electrolytic capacitor, a supercapacitor, and an electric double-layer capacitor, which is capable of temporarily storing and accumulating a small capacity of electric energy obtained by conversion of natural energy. Furthermore, even if the capacitor element can be used as the power source, it is not possible to make the wireless transmitter properly function because of large power consumption.

Furthermore, at the start of power supply, the above-mentioned semiconductor device requires a procedure (configuration) of reading, from a ROM (Read Only Memory) outside the semiconductor device or a ROM built in the semiconductor device, preliminarily stored circuit information regarding a circuit to be configured in the semiconductor device, and re-configuring circuit connections inside the semiconductor device. Accordingly, the ROM, a configuration time, and electric power required in the configuration are necessary. In particular, as the scale of the circuit connections becomes greater as it is in these days, the electric power required in the configuration tends to become higher.

Furthermore, the configuration is not recorded in the semiconductor device in a non-volatile manner and, therefore, must be repeated every time when power supply is turned on.

On the other hand, the NB-FPGA semiconductor device 101 according to the one embodiment of this invention illustrated in FIG. 1 does not require, at the time when power supply is turned on again, means for reading the circuit information from the ROM into the semiconductor device and developing (configuration) means for developing circuit connections information. Accordingly, in the NB-FPGA semiconductor device, electric power required for reading the circuit information and for the configuration is unnecessary and a wake-up time of the circuits is short. This is because each of the variable-resistance elements included in the NB-FPGA semiconductor device is non-volatile and rewritable so as to maintain an internal state and hold a circuit-connection state even when electric energy is not supplied. The variable-resistance element of the type may be constituted by a variable-resistance element such as a ReRAM (Resistance Random Access Memory) using a transition metal oxide and a non-volatile NanoBridge (Registered Trademark) using an ion conductor. It is noted here that, in the NB-FPGA semiconductor device, the above-mentioned variable-resistance element is used in all portions where connection/non-connection between transistors as basic constituent elements is determined. Likewise, in case where the NB-FPGA semiconductor device includes the RAM and/or the ROM, the above-mentioned variable-resistance element is used in all portions where connection/non-connection between transistors is determined.

First Example

Now, referring to FIG. 2, an IoT/MTM wireless transmitter according to a first example of this invention will be described.

The IoT/MTM wireless transmitter illustrated in the figure includes a Nano Bridge-FPGA (NB-FPGA) semiconductor device 101 including NanoBridge (Registered Trademark) variable-resistance elements.

The NB-FPGA 101 is connected to an energy converter 102 for converting natural energy such as wind power and solar light into electric energy, and a voltage limiter or rectifier 103.

Furthermore, the IoT/MTM wireless transmitter illustrated in the figure comprises a capacitor element 104 such as an electrolytic capacitor, a supercapacitor, and an electric double-layer capacitor, a hysteresis-type threshold determining unit 105, a wireless modulator (MOD) 106, and an antenna 107. The IoT/MTM wireless transmitter is connected to a first sensor 108 and a second sensor 109 for detecting physical quantities such as a temperature, a humidity, an acceleration rate, a gravity, and a magnetism. The first and the second sensors 108 and 109 may detect physical quantities different from one another or may detect the same physical quantity at different locations.

Figure 2:
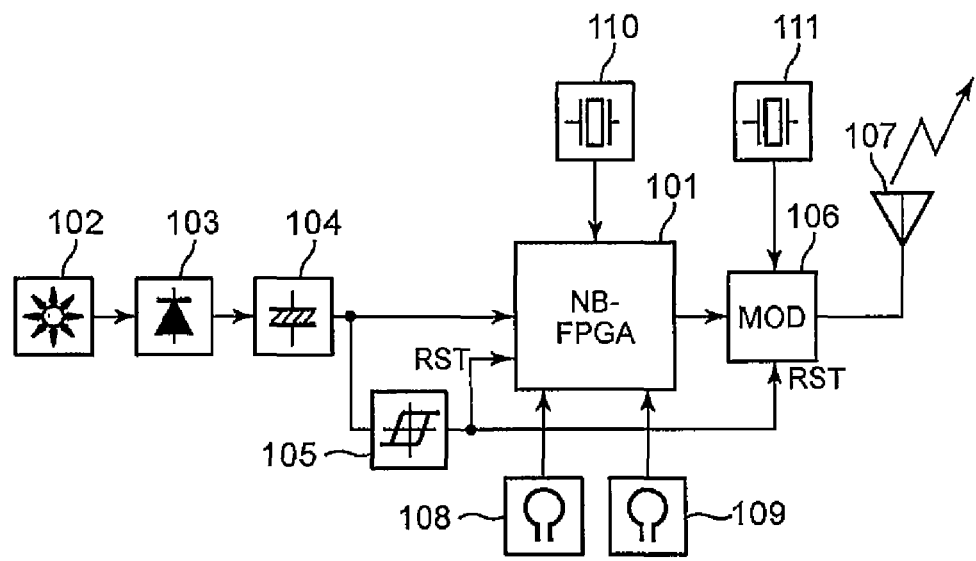
FIG. 2 is a block diagram for illustrating the IoT/MTM wireless transmitter according to one example of this invention.

The IoT/MTM wireless transmitter illustrated in FIG. 2 includes first and second crystal oscillators 110 and 111.

The natural energy is converted by the energy converter 102 into the electric energy. The energy converter 102 supplies a direct current or an alternating current to the voltage limiter or rectifier 103. The capacitor element 104 stores the electric energy after limitation of a peak voltage of the direct current or the alternating current or after rectification into the direct current. At this time, electric charges stored in the capacitor element 104 are blocked by the rectifier 103 so as not to flow out towards the energy converter 102 due to a voltage difference between the capacitor element and the energy converter 102.

Herein, when a voltage of the capacitor element 104 is not lower than a threshold value set by the hysteresis-type threshold determining unit 105, the NB-FPGA semiconductor device 101 and the wireless modulator 106 are kept in a set state in which the IoT/MTM wireless transmitter can be operated. On the other hand, when the voltage is lower than the threshold value, the NB-FPGA semiconductor device 101 and the wireless modulator 106 are kept in a reset state and the IoT/MTM wireless transmitter does not operate.

Electric power from the capacitor element 104 is continuously supplied to the NB-FPGA semiconductor device 101 irrespective of whether it is large or small. In this state, the NB-FPGA semiconductor device 101 converts, with the capacitor element 104 used as a power source, each of the physical quantity measured by the first sensor 108 and the physical quantity measured by the second sensor 109 into packet data by using a main clock generated by the first crystal oscillator 110. In this case, the NB-FPGA semiconductor device 101 sends the packet data to the wireless modulator 106 at a timing required by the wireless modulator 106 or at an appropriate timing by using the main clock generated by the first crystal oscillator 110. The wireless modulator 106 is supplied with a clock from the second crystal oscillator 111 as a source of a modulation frequency transmitted from the antenna 107. Accordingly, the wireless modulator 106 modulates the above-mentioned packet data obtained from the NB-FPGA semiconductor device 101 by using the clock from the second crystal oscillator 111 and then transmits modulated packet data through the antenna 107.

In FIG. 2, power supply lines to the wireless modulator 106, the first and the second sensors 108 and 109, and the first and the second crystal oscillators 110 and 111 are omitted.

Figure 3:
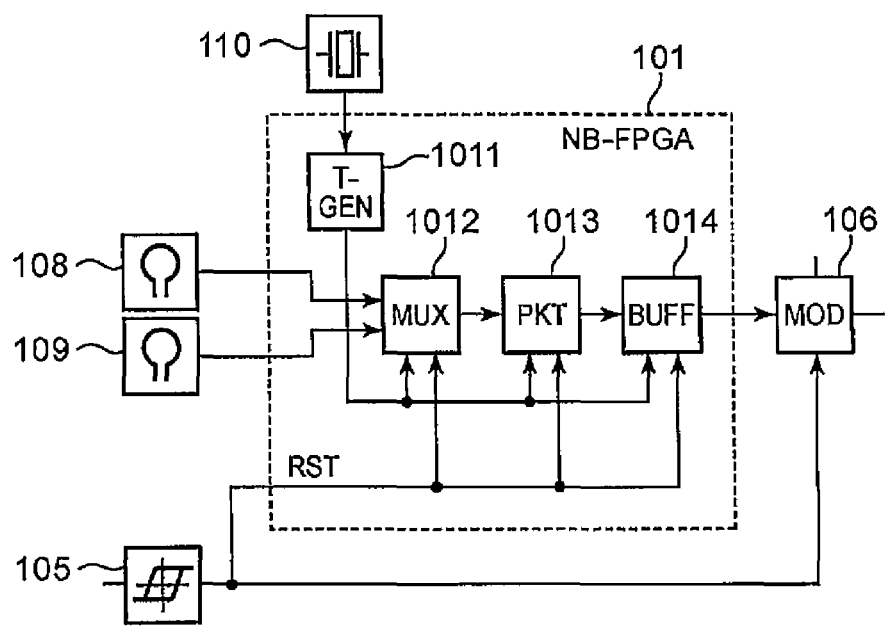
FIG. 3 is a view for illustrating more in detail a structure of an NB-FPGA semiconductor device illustrated in FIGS. 1 and 2.

Next, description will be made of an internal structure of the NB-FPGA semiconductor device 101 illustrated in FIG. 2. In FIG. 3, the internal structure of the NB-FPGA semiconductor device 101 in FIG. 2 is illustrated. The NB-FPGA semiconductor device 101 comprises a timing generator 1011, a multiplexer 1012, a packet generator 1013, and a buffer 1014. Each of the timing generator 1011, the multiplexer 1012, the packet generator 1013, and the buffer 1014 has the above-mentioned variable-resistance element at portions where connection/non-connection between transistors is determined.

The NB-FPGA semiconductor device 101 illustrated in FIG. 3 is connected to the first and the second sensors 108 and 109 and the hysteresis-type threshold determining unit 105, in the manner similar to FIG. 2.

Inside the NB-FPGA semiconductor device 101, the physical quantities measured by the first and the second sensors 108 and 109 are combined by the multiplexer 1012 into single data to be transmitted to the packet generator 1013. The packet generator 1013 generates packet data with a header, a control part, and parity check added thereto in accordance with an input format of the wireless modulator 106, and thereafter stores the packet data in the buffer 1014.

A series of steps from the first and the second sensors 108 and 109 to the buffer 1014 are carried out according to a timing generated by the timing generator 1011. The above-mentioned packet data is finally transmitted from the buffer 1014 to the wireless modulator 106 on the outside. An output of the hysteresis-type threshold determining unit 105 is used to bring respective functions inside the NB-FPGA semiconductor device 101 into a reset (RST) state.

Now, in order to specifically describe an effect of the IoT/MTM wireless transmitter illustrated in FIG. 2, description will be made of a case where the commercially-available CPLD or FPGA semiconductor device is applied instead of the NB-FPGA semiconductor device 101 in FIG. 2. In the CPLD or the FPGA semiconductor device, constituent circuits can be rewritten repeatedly.

Figure 4:
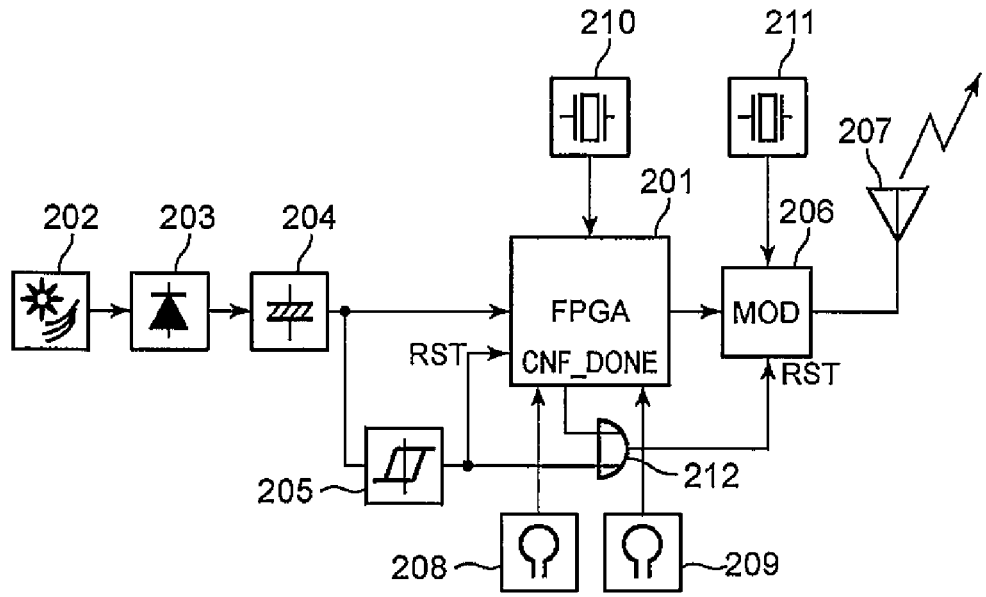
FIG. 4 is a view for illustrating a structure of an IoT/MTM wireless transmitter using a FPGA semiconductor device commercially available.

Referring to FIG. 4, an example in which an IoT/MTM wireless transmitter is constituted by using the commercially-available FPGA semiconductor device. The IoT/MTM wireless transmitter illustrated in FIG. 4 comprises the commercially-available FPGA semiconductor device 201, an energy converter 202 for converting natural energy into electric energy, a voltage limiter or rectifier 203, a capacitor element 204 such as an electrolytic capacitor, a supercapacitor, an electric double-layer capacitor. The FPGA semiconductor device 201 is connected to a hysteresis-type threshold determining unit 205, a wireless modulator 206, and an antenna 207. Furthermore, the FPGA semiconductor device 201 is connected also to first and second sensors 208 and 209 and first and second crystal oscillators 210 and 211.

Furthermore, the FPGA semiconductor device 201 is connected to an OR circuit 212 outside of the FPGA semiconductor device 201. The OR circuit 212 may be located inside the FPGA semiconductor device 201.

A direct current or an alternating current obtained by conversion into electric energy by the energy converter 202 is limited in peak voltage or rectified into the direct current by the voltage limiter or rectifier 203 and then stored in the capacitor element 204. At this time, electric charges stored in the capacitor element 204 are blocked by the rectifier 203 so as not to flow out towards the energy converter 202 due to a voltage difference from the energy converter 202. Herein, when a voltage of the capacitor element 204 is not lower than a threshold value set by the hysteresis-type threshold determining unit 205, the FPGA semiconductor device 201 and the wireless modulator 206 are put into a set state and can be operated. When the voltage is lower than the threshold value, the FPGA semiconductor device 201 and the wireless modulator 206 are put into a reset state and do not operate.

Herein, the OR circuit 212 produces a logical sum of a configuration completion signal (CNF_DONE) produced from the FPGA semiconductor device 201 and the output of the hysteresis-type threshold determining unit 205 and supplies the logical sum to a reset (RST) terminal of the wireless modulator 206. Electric power from the capacitor element 204 is continuously supplied to the FPGA semiconductor device 201 irrespective of whether it is large or small.

The FPGA semiconductor device 201 converts, with the capacitor element 204 used as a power source, each of a physical quantity measured by the first sensor 208 and a physical quantity measured by the second sensor 209 into packet data by using a main clock generated by the first crystal oscillator 210, and sends the packet data to the wireless modulator 206 at a timing required by the wireless modulator 206 or at an appropriate timing. Supplied with a clock from the second crystal oscillator 211 as a source of a modulation frequency transmitted from the antenna 207, the wireless modulator 206 modulates the above-mentioned packet data obtained from the FPGA semiconductor device 201 and transmits modulated packet data through the antenna 207.

In this figure also, power supply lines connected to the wireless modulator 206, the first and the second sensors 208 and 209, and the first and the second crystal oscillators 210 and 211 are omitted.

Figure 5:
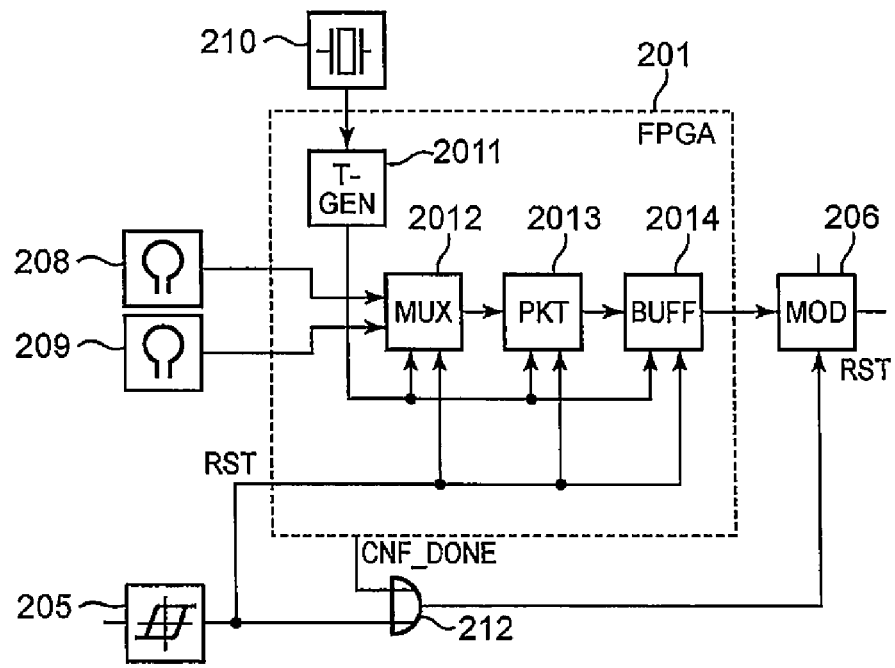
FIG. 5 is a view for illustrating a structure of a FPGA semiconductor device used in FIG. 4.

In FIG. 5, an internal structure of the FPGA semiconductor device 201 in FIG. 4 is illustrated. The FPGA semiconductor device 201 comprises a timing generator 2011, a multiplexer 2012, a packet generator 2013, and a buffer 2014. The FPGA semiconductor device 201 does not include a variable-resistance element between transistors.

Inside the FPGA semiconductor device 201, the physical quantity measured by the first sensor 208 and the physical quantity measured by the second sensor 209 are combined by the multiplexer 2012 into single data, then processed at the packet generator 2013 into packet data with a header, a control part, and parity check added thereto in accordance with an input format of the wireless modulator 206, and thereafter stored in the buffer 2014. In a series of steps from the first and the second sensors 208 and 209 to the buffer 2014, processing and transition are carried out according to a timing generated by the timing generator 2011. The above-mentioned packet data is finally transmitted from the buffer 2014 to the wireless modulator 206 on the outside. An output of the hysteresis-type threshold determining unit 205 is used to bring respective functions inside the FPGA semiconductor device 201 into a reset (RST) state.

Figure 6:
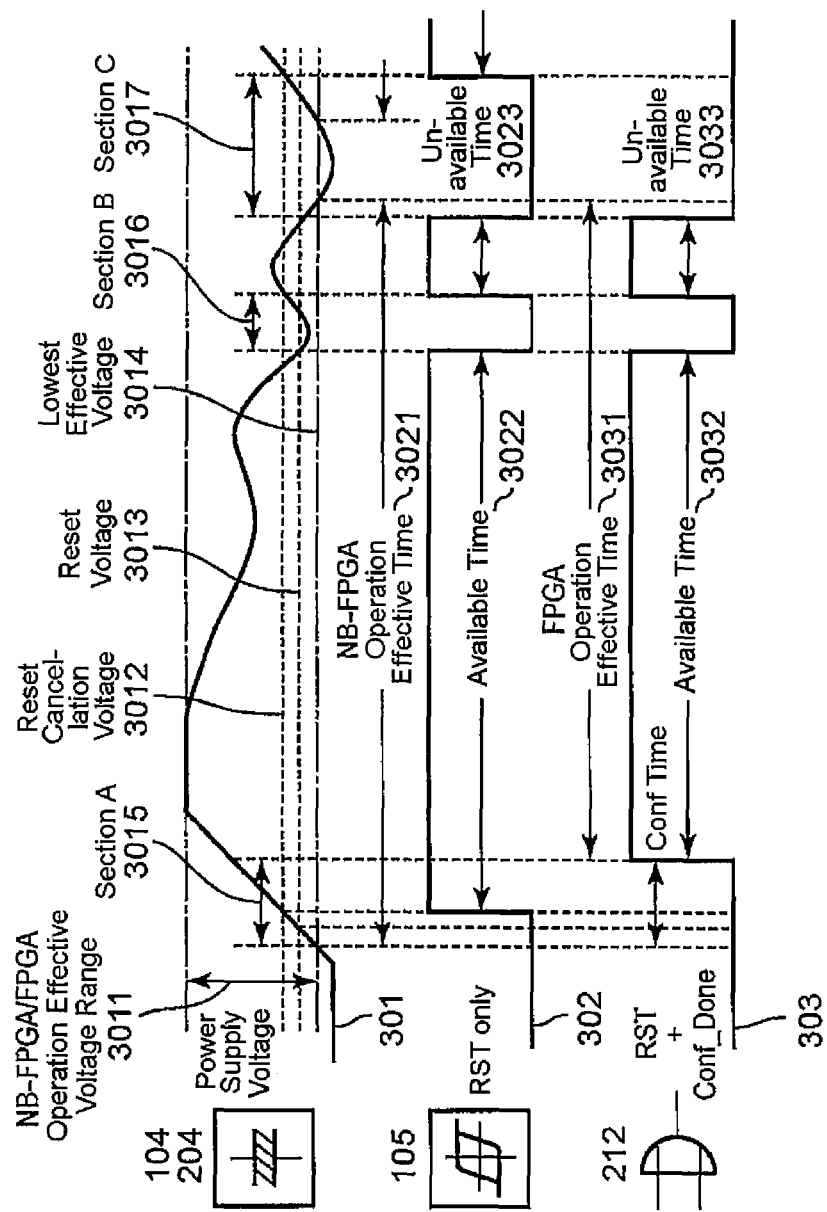
FIG. 6 is a waveform chart for describing a difference in available time between the IoT/MTM wireless transmitter using the NB-FPGA semiconductor device and the IoT/MTM wireless transmitter using the FPGA semiconductor device commercially available.

In FIG. 6, operation waveforms of the IoT/MTM wireless transmitter using the NB-FPGA semiconductor device shown in FIG. 2 and the IoT/MTM wireless transmitter using the commercially-available FPGA semiconductor device shown in FIG. 4 are illustrated for the purpose of comparison.

At an upper part of FIG. 6, power supply voltages supplied from the capacitor elements 104 and 204 are illustrated. At a middle part of FIG. 6, an operation time of the wireless transmitter in FIG. 2 is illustrated. At a lower part of FIG. 6, an operation time of the wireless transmitter in FIG. 4 is illustrated.

In order to facilitate an understanding, it is assumed in this example that the NB-FPGA semiconductor device in FIG. 2 and the FPGA semiconductor device in FIG. 4 have the same operable voltage range in the power supply voltage.

Among reference numerals in FIG. 6, 301 represents a state of variation with time of the power supply voltage supplied from the capacitor element 104 or 204. 3011 represents an operation effective voltage range in the NB-FPGA semiconductor device and the ordinary FPGA semiconductor device and operation effective voltages of those devices are assumed to be the same. Furthermore, 3012 represents a power supply voltage at the time of cancellation of the reset state of the NB-FPGA semiconductor device, the FPGA semiconductor device, and so on (=Reset cancellation voltage). 3013 represents a power supply voltage at the time when the reset state of the NB-FPGA semiconductor device and the FPGA semiconductor device becomes effective (=Reset voltage). Herein, the Reset cancellation voltage and the Reset voltage are a voltage for reset-cancelling and resetting the entire NB-FPGA semiconductor device and the entire FPGA semiconductor device, respectively.

Herein, 3014 represents a lowest effective voltage allowing the NB-FPGA semiconductor device and the FPGA semiconductor device to operate.

A section A represented by 3015 is a section in which the power supply voltage is within the operation effective voltage range 3011 and Reset (RST)+Conf_Done is effective.

A section B represented by 3016 is a section in which the power supply voltage is within the operation effective voltage range 3011 but Reset (RST) is effective.

A section C represented by 3017 is a section in which the power supply voltage is outside the operation effective voltage range 3011 and Reset (RST) is effective.

302 shown at the middle part represents a state of variation with time when the hysteresis-type threshold determining unit 105 produces the reset (RST) signal in case where the IoT/MTM wireless transmitter in FIG. 2 is operated.

3021 represents an operation effective time of the NB-FPGA semiconductor device when the power supply voltage falls within the operation effective voltage range 3011 whereas 3022 represents an available time obtained by subtracting a reset (RST) time from the operation effective time 3021 of the NB-FPGA semiconductor device.

Furthermore, 3023 represents the reset (RST) time and an unavailable time in which the power supply voltage is lower than the lowest effective voltage 3014.

On the other hand, 303 shown at the lower part in FIG. 6 represents a state of change with time of an output of the OR circuit 212 when the IoT/MTM wireless transmitter in FIG. 4 is operated. 3031 represents an operation effective time of the FPGA semiconductor device when the power supply voltage falls within the operation effective voltage range 3011. 3032 represents an available time obtained by subtracting the reset (RST) time from the operation effective time 3031 of the FPGA semiconductor device.

3033 represents the reset (RST) time and an unavailable time during which the power supply voltage is lower than the lowest effective voltage 3014.

Here are situations in the section A represented by 3015 at the time when power supply is turned on, the section B represented by 3016 when Reset (RST) is effective, and the section C represented by 3017 when the power supply voltage is lower than the lowest effective voltage 3014 and Reset (RST) is effective.

Among the respective sections A (3015), B (3016), and C (3017) in FIG. 6, the section B (3016) and the section C (3017) are the same in either case where the NB-FPGA semiconductor device 101 or the FPGA semiconductor device 201 is used. On the other hand, it is understood that, as shown in the change 303 with time of the output of the OR circuit 212, the available time 3032 by the FPGA semiconductor device 201 is shorter than the available time 3022 of the NB-FPGA semiconductor device.

This provides the effect that, in the NB-FPGA semiconductor device, the configuration time in the commercially-available FPGA is deleted and the electric power required in the configuration time becomes unnecessary. In case where the NB-FPGA semiconductor device is used, configuration need not be repeated every time when power supply is turned on. This means an increased opportunity to transmit the physical quantity measured by the first sensor 108 and the physical quantity measured by the second sensor 109 illustrated in FIG. 2 are increased.

Second Example

Figure 7:
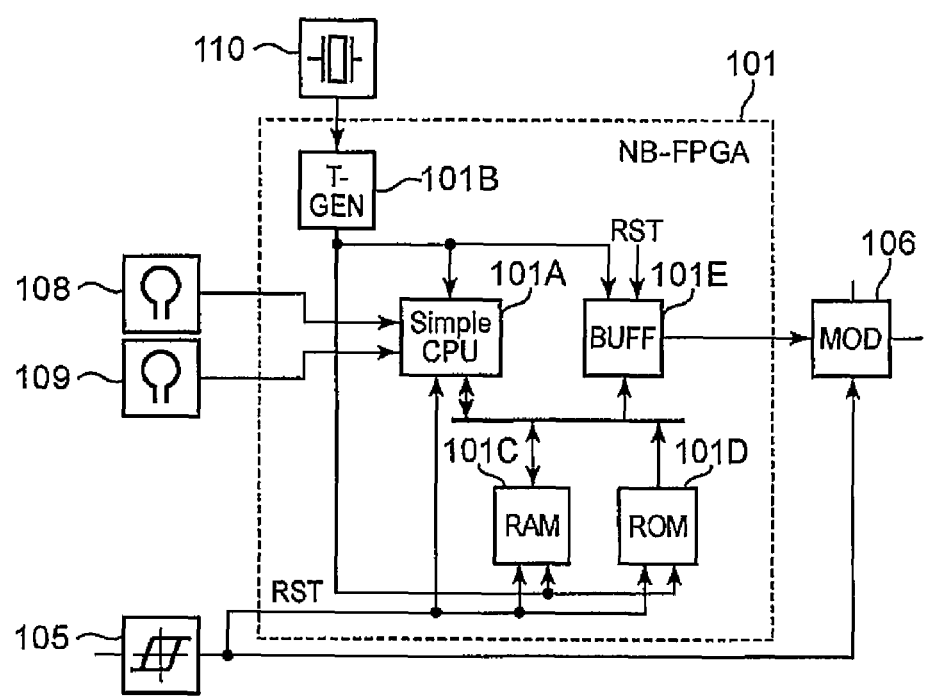
FIG. 7 is a view for describing a NB-FPGA semiconductor device used in a second example of this invention.

In a second example illustrated in FIG. 7, a content written into the NB-FPGA semiconductor device 101 is processed, not by true hardware logic illustrated in FIG. 3, but by a simple CPU included therein. In this respect, the second example illustrated in FIG. 7 is different from the example in which an IoT sensor node is configured using the NB-FPGA semiconductor device in FIG. 2. Specifically, the second example of this invention represents the NB-FPGA semiconductor 101 having another internal structure. Specifically, the NB-FPGA semiconductor device 101 illustrated in the figure comprises a simple CPU 101A, a timing generator 101B, a RAM 101C, a ROM 101D, and a buffer 101E. A variable-resistance element is disposed at each position where connection/non-connection between transistors in each of those components is determined.

In case of the second example, simultaneously when power supply is turned on, the NB-FPGA semiconductor device 101 develops a program stored in the ROM 101D on the RAM 101C to start the program. In the NB-FPGA semiconductor device 101, the physical quantities measured by the first and the second sensors 108 and 109 are imported by a polling function or an interrupt function of the simple CPU 101A and temporarily stored in the RAM 101C. For example, the simple CPU 101A calculates an average of the two physical quantities of the first and the second sensors 108 and 109. Furthermore, in order to packetize the average physical quantity, the simple CPU 101A adds a header, a control part, parity check, and so on in accordance with the input format of the wireless modulator 106. Herein, packet data obtained by packetization is stored in the buffer 101E.

A series of steps from the first and the second sensors 108 and 109 to the buffer 101E are carried out according to a timing generated by the timing generator 101B. The above-mentioned packet data is finally transmitted from the buffer 101E to the wireless modulator 106 on the outside.

An output of the hysteresis-type threshold determining unit 105 is used to bring respective functions inside the NB-FPGA semiconductor device 101 into a reset (RST) state.

Generally, the ROM 101D is mounted separately on the outside of the NB-FPGA semiconductor device 101 and is configured to be program-writable/changeable by using JTAG (Joint Test Action Group) or the like. However, in this example, a technique is adopted in which the program is already written in the form of assembler language at a stage of RTL (Register Transfer Level) as a source of the circuit information written into the NB-FPGA semiconductor device 101. Accordingly, into the NB-FPGA semiconductor device 101, writing of assembler description is completed by one-time writing of the circuit information. The RTL mentioned above is a collective term of HDLs (hardware descriptive languages) such as System Verilog and Verilog-HDL.

In case where a device corresponding to the device in FIG. 7 is implemented by the ordinary FPGA, two steps of writing the circuit information into the FPGA semiconductor device and writing of the program into the ROM are required.

However, in case where the NB-FPGA semiconductor device is used, implementation is possible with one step of writing the circuit information.

In the foregoing, this invention has been described with reference to the embodiment and/or the example by way of example. However, specific structures of this invention are not limited to the foregoing embodiment and any changes which does not deviate from the gist of this invention are included in this invention. For example, separation and combination of block structures and replacement of the steps in the embodiment and/or the example mentioned above may be freely made as far as the gist of this invention and the functions described are satisfied. This invention is never limited by the foregoing description.

A part or a whole of the foregoing embodiment may be described as follows. The following supplementary notes do not limit this invention at all.

[Supplementary Note 1]

An IoT/MTM wireless transmitter comprising a semiconductor device including variable-resistance elements each of which is non-volatile and rewritable and is configured to hold each internal state without electric energy, and a modulator configured to receive information from the semiconductor device and transmit the information as a wireless signal.

[Supplementary Note 2]

The IoT/MTM wireless transmitter according to Supplementary Note 1, wherein the semiconductor device is Nano-Bridge (Registered Trademark)-FPGA (hereinafter abbreviated to NB-FPGA).

[Supplementary Note 3]

The IoT/MTM wireless transmitter according to Supplementary Note 1 or 2, wherein, when the semiconductor device is turned on again, configuration regarding an internal structure of the semiconductor is not required.

[Supplementary Note 4]

The IoT/MTM wireless transmitter according to any one of Supplementary Notes 1 to 3, further comprising a capacitor element operable as a power source, the semiconductor device being operated by power supply from the capacitor element.

[Supplementary Note 5]

The IoT/MTM wireless transmitter according to any one of Supplementary Notes 1 to 5, wherein the capacitor element is supplied with natural energy.

[Supplementary Note 6]

The IoT/MTM wireless transmitter according to any one of Supplementary Notes 1 to 5, further comprising at least one sensor.

[Supplementary Note 7]

An IoT/MTM wireless transmission method of processing information from the sensor to produce and transmit a wireless signal by using a NB-FPGA as a semiconductor device including variable-resistance elements each of which is non-volatile and rewritable and is configured to hold each internal state without electric energy.

[Supplementary Note 8]

The IoT/MTM wireless transmission method according to Supplementary Note 7, wherein a capacitor element is connected to the semiconductor device and the capacitor element is supplied with natural energy.

[Supplementary Note 9]

The IoT/MTM wireless transmission method according to Supplementary Note 7 or 8, wherein the semiconductor device does not produce configuration regarding an internal structure of the semiconductor device when the semiconductor device is turned on again.

[Supplementary Note 10]

The IoT/MTM wireless transmission method according to any one of Supplementary Notes 7 to 9, wherein an electrolytic capacitor, a supercapacitor, and an electric double layer capacitor are used as the capacitor element.

[Supplementary Note 11]

An IoT/MTM wireless transmitter comprising a capacitor element; a semiconductor device including variable-resistance elements each of which is non-volatile and rewritable and is configured to hold each internal state without electric energy; a modulator configured to receive information from the semiconductor device and transmit the information as a wireless signal; and a sensor, wherein the capacitor element operates as a power source of the semiconductor device.

[Supplementary Note 12]

The IoT/MTM wireless transmitter according to Supplementary Note 11, further comprising an energy converter configured to perform energy conversion of natural energy, and a voltage limiter or rectifier provided between the energy converter and the capacitor element.

[Supplementary Note 13]

The IoT/MTM wireless transmitter according to Supplementary Note 12, further comprising a threshold determining unit configured to determine a threshold value of power supply from the capacitor element.

[Supplementary Note 14]

The IoT/MTM wireless transmitter according to any one of Supplementary Notes 11 to 13, wherein the semiconductor device comprises a multiplexer, a packet generator, and a buffer.

[Supplementary Note 15]

The IoT/MTM wireless transmitter according to any one of Supplementary Notes 11 to 13, wherein the semiconductor device comprises a CPU, a buffer, an RAM, and an ROM.

This invention is usable as an IoT/MTM wireless transmitter operated by natural energy. In this case, with the IoT/MTM wireless transmitter, it is possible to stably operate the wireless transmitter located at a remote place where a commercial power source cannot be used.

This invention is based upon and claims the benefit of priority from Japanese patent application No. 2018-041553, filed on Mar. 8, 2018 the disclosure of which is incorporated herein in its entirety by reference.

DESCRIPTION OF REFERENCE SYMBOLS

101 NB-FPGA semiconductor device
201 FPGA semiconductor device
102, 202 energy converter
103, 203 voltage limiter or rectifier
104, 204 capacitor element
105, 205 hysteresis-type threshold determining unit
106, 206 wireless modulator
107, 207 antenna
108, 208 first sensor
109, 209 second sensor
110, 210 first crystal oscillator
111, 211 second crystal oscillator
1011, 2011 timing generator
1012, 2012 multiplexer
1013, 2013 packet generator
1014, 2014 buffer
205 OR circuit

What is claimed is:

1. An Internet-of-Things (IoT)/Machine-To-Machine (MTM) wireless transmitter comprising:

a capacitor element that stores electric energy supplied thereto and is operable as a power source;

a semiconductor device that operates by power supply from the capacitor element and including variable-resistance elements each of which is non-volatile and rewritable and is configured to hold each conduction state without electric energy;

a modulator configured to receive information from the semiconductor device and transmit the information as a wireless signal by using the power supply from the capacitor element, and a hysteresis comparator circuit that performs threshold value judgment in a hysteresis pattern so that, when a voltage value of the capacitor element is not lower than a threshold value set by the hysteresis comparator circuit, the semiconductor device and the modulator are kept in a set state in which the IoT/MTM wireless transmitter can be operated, and that, when the voltage value is lower than the threshold value, the semiconductor device and the modulator are kept in a reset state in which the IoT/MTM wireless transmitter does not operate.

2. The IoT/MTM wireless transmitter according to claim 1, wherein, when the voltage value of the capacitor element exceeds the threshold value (Reset cancellation voltage) in the set state, configuration regarding an internal structure of the semiconductor device is not required.

3. The IoT/MTM wireless transmitter according to claim 1, wherein the capacitor element is supplied with natural energy via an energy converter.

4. The IoT/MTM wireless transmitter according to claim 1, further comprising at least one sensor connected to the semiconductor device.

5. An Internet-of-Things (IoT)/Machine-To-Machine (MTM) wireless transmission method for an IoT/MTM wireless transmitter, the IoT/MTM wireless transmitter including a capacitor element that stores electric energy supplied thereto and is operable as a power source, a semiconductor device that operates by power supply from the capacitor element and including variable-resistance elements each of which is non-volatile and rewritable and is configured to hold each conduction state without electric energy, a modulator configured to receive information from the semiconductor device and transmit the information as a wireless signal by using the power supply from the capacitor element, and a hysteresis comparator circuit that performs threshold value judgment in a hysteresis pattern, the IoT/MTM wireless transmission method comprising:

performing judgment so that, when a voltage value of the capacitor element is not lower than a threshold value set by the hysteresis comparator circuit, the semiconductor device and the modulator are kept in a set state in which the IoT/MTM wireless transmitter can operate, and that, when the voltage value is lower than the threshold value, the semiconductor device and the modulator are kept in a reset state in which the IoT/MTM wireless transmitter does not operate, and processing, in the set state, the information from a sensor to produce and transmit a wireless signal by using the semiconductor device and the modulator.

6. The IoT/MTM wireless transmission method according to claim 5, wherein the capacitor element is connected to the semiconductor device and the capacitor element is supplied with natural energy via an energy converter.

7. The IoT/MTM wireless transmission method according to claim 5, wherein the semiconductor device does not produce configuration regarding an internal structure of the semiconductor device and generates the information from the sensor when the semiconductor device is turned on again, the voltage value of the capacitor element exceeds the threshold value (Reset cancellation voltage) in the set state.

8. The IoT/MTM wireless transmitter according to claim 1, wherein, when the reset state is changed to the set state as a result of the judgment of the hysteresis comparator circuit, the semiconductor device generates the information and sends the information to the modulator without performing configuration.

9. The IoT/MTM wireless transmission method according to claim 5, wherein, when the reset state is changed to the set state as a result of the judgment of the hysteresis comparator circuit, the semiconductor device generates the information and sends the information to the modulator without performing configuration.

* * * * *